March 5, 1968  R. L. TRAPP  3,371,673
HYDRAULIC SPEED GOVERNOR CONTROL
Filed Oct. 14, 1964
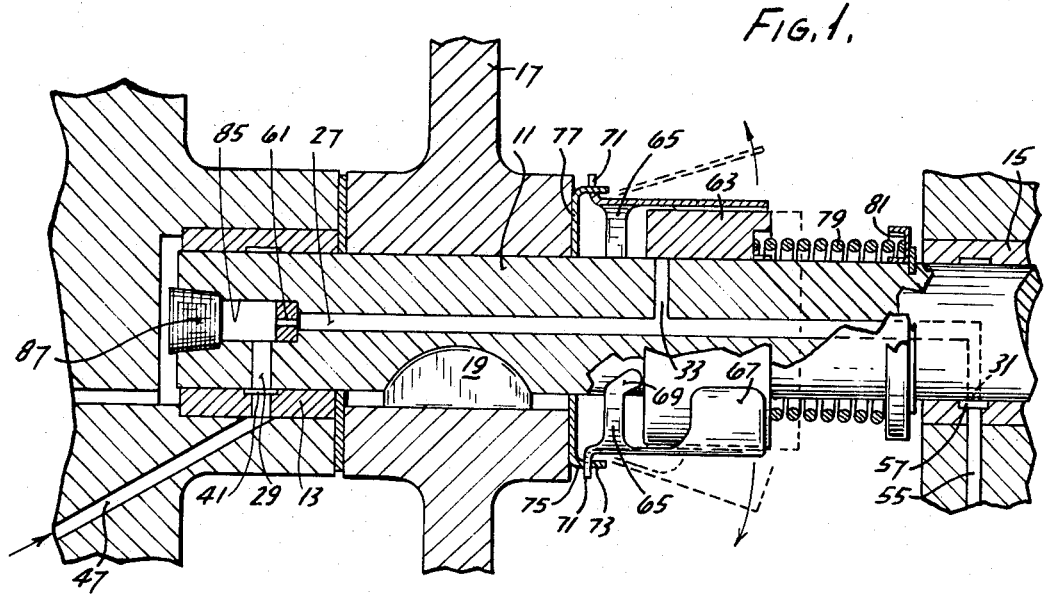
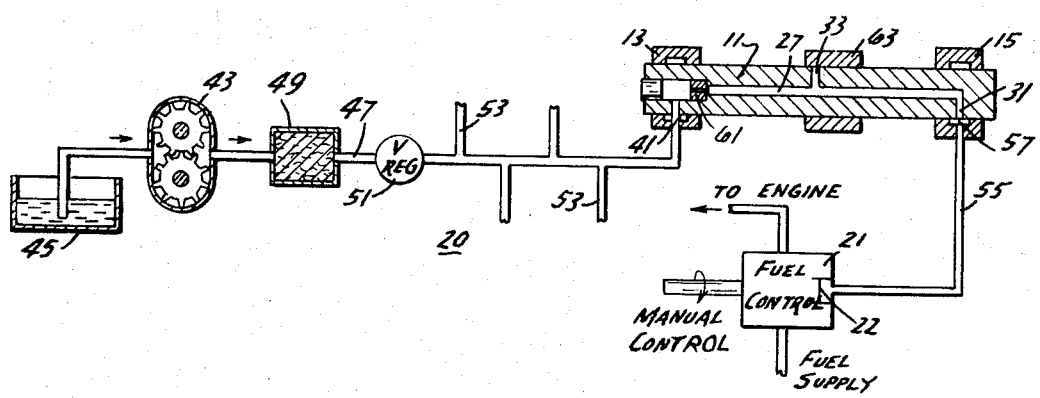
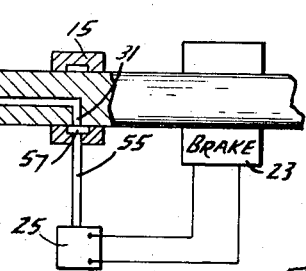
INVENTOR.
ROBERT L. TRAPP
BY
Wheeler, Wheeler & Wheeler
ATTORNEYS.

United States Patent Office 3,371,673
Patented Mar. 5, 1968

3,371,673
HYDRAULIC SPEED GOVERNOR CONTROL
Robert L. Trapp, Milwaukee, Wis., assignor to Outboard Marine Corporation, Waukegan, Ill., a corporation of Delaware
Filed Oct. 14, 1964, Ser. No. 403,728
5 Claims. (Cl. 137—34)

ABSTRACT OF THE DISCLOSURE

Disclosed herein is an output shaft overspeed governor which is connected to a fluid pressure sensing fuel control device operable to control the rate of rotation of the shaft and which is operable, in response to rotation of the shaft above a predetermined speed, to open a valve so as to dump fluid pressure oil whereby to affect the fluid pressure sensing fuel control device to cause a reduction in engine speed.

---

The invention relates generally to speed control arrangements. More particularly, the invention relates to overspeed governing arrangements and systems which serve to reduce shaft speed in the event such speed exceeds a predetermined limit.

The invention provides a speed responsive, pressure fluid system for actuating a device operable to cause speed reduction. Such a speed reducing device can take various forms, as for instance, a device which regulates fuel flow to a driving prime mover or a brake which acts directly on the overspeed shaft or on a connected shaft. Other objects and advantages of the invention will become known by reference to the following description and the accompanying drawings in which:

FIGURE 1 is an enlarged fragmentary view, partially in section, of a portion of one embodiment of an overspeed regulating arrangement or system embodying various of the features of the invention;

FIGURE 2 is a schematic view of an overall arrangement shown partially in FIGURE 1; and FIGURE 3 is a fragmentary view of another embodiment of an overspeed regulating arrangement embodying various of the features of the invention.

Shown in FIGURE 1 is a shaft 11 which is rotatably mounted by means in the form of spaced bearings 13 and 15 and which is driven from any suitable prime mover (not shown) by means in the form of a gear 17 keyed at 19 to the shaft 11.

In FIGURE 2, there is shown schematically a fluid pressure sensitive means or arrangement 20 for regulating the speed of the shaft 11. Such speed regulating means can take various forms and can include, for instance, a device for controlling operation of the prime mover or engine, such as by controlling the fuel supply thereto, or a braking device operable on the overspeed shaft or on another shaft connected thereto.

In FIGURE 2, there is shown a conventional device 21 which controls fuel supply to an engine or prime mover and which includes means 22 sensitive to fluid pressure. The device 21 operates to reduce fuel flow in response to a drop in fluid pressure applied to said means 22. In FIGURE 3, there is shown a device including a brake 23 which is energized or operable through the action of a pressure sensitive relay or switch 25. The speed controlling device 21, and the pressure switch 25 are actuated by a fluid system or means which is operable in response to rotation of the shaft 11 above a predetermined speed to cause a drop in the pressure condition sensed by the device 21 or the switch 25.

More specifically, the fluid system comprises a fluid passage 27 in the shaft 11, which passage includes axially spaced first, second, and third ports 29, 31 and 33, respectively. The first port 29 extends from one end of the fluid passage and connects or registers with means affording communication with a source of pressure fluid. In the preferred construction, the pressure fluid is lubricating oil and the port 29 is connected to the pressure fluid source through an annular groove 41 in the bearing 13, whereby the bearing 13 is also lubricated by the same arrangement.

Various pressure fluid sources can be employed. As shown in FIGURE 2, the source of pressure fluid comprises a pump 43 which communicates with a reservoir 45 and which supplies pressure fluid through a conduit 47 to the annular groove 41 in the bearing 13. Included in the conduit 47 are a filter 49 and a pressure regulator 51 affording return to the reservoir 45 of any oil in excess to the needs of the system. The conduit 47 can also include several branches 53 which can be employed to afford lubrication wherever desired.

The other end of the fluid passage 27 in the shaft 11 terminates in the second port 31 which communicates through conduit means 55 connected with either the pressure sensitive device 21 (FIG. 2) or the pressure switch 25 (FIG. 3). Preferably, as shown in the drawings, communication between the port 31 and the conduit means 55 is through an annular groove 57 in bearing 15, whereby lubrication of the bearing 15 is also afforded.

Variation of the pressure in the conduit means 55 is provided by means including the third port 33 and speed responsive means operable to open port 33 for the discharge of pressure fluid therefrom when the rotative speed of the shaft 11 exceeds a given limit. In addition, the means for varying the pressure sensed by either of the device 21 or switch 25 also preferably includes an orifice 61 (see FIG. 1) in the fluid passage 27 between the port 29 and each of the ports 31 and 33.

The speed responsive means for opening the port 33 includes a valve member in the form of a ring or collar 63 which is shiftable axially of the shaft 11 and relative to a position closing the port 33. In addition, the speed responsive means for opening port 33 includes means operable above a predetermined speed for shifting the ring 63 to open the port 33. In the disclosed construction, such means includes a pair of wing members 65, each including arcuate portions 67 engaging the periphery of the ring 63 when in its port-closing position, abutment fingers 69 engaging one end face of the ring 63, and mounting tabs 71.

Mounting of the wing members 65 to provide for rotation with the shaft 11 and radially outward movement thereof upon increasing speed is afforded by locating the mounting tabs 71 in apertures 73 located in the flange 75 of an annular member 77 fixed to the shaft 11.

Engagement of the ring 63 with the fingers 69 and location of the ring 63 in closing relation to the port 33 is provided by biasing means in the form of a spring 79 which surrounds the shaft 11 and is seated against the other end face of the ring 63 and against a seat 81 fixed to the shaft 11.

Upon rotation of the shaft 11 at an excessive speed, the wing members 65 are pivoted radially along the shaft 11 by reason of the action of the fingers 69 against the ring. Such axial movement of the ring opens the port 33, with consequent rapid dissipation of the pressure contained in the fluid passage 27 and the conduit means 55. This drop in fluid pressure in the conduit means 55 is immediately sensed by either of the device 21 or the switch 25 to effect a reduced rate of shaft rotation. Oil discharged from the port returns to the oil reservoir.

Upon such reduction in speed, the collar or ring 63 again moves into closing relation to the port 33. Fluid flow to the conduit means 55 will increase the pressure acting on the device 21 or on the switch 25 until speed reducing action of the device 21 or switch 25 is no longer obtained.

In order to obtain a rather sharp drop in the pressure condition sensed by the device 21 or the switch 25 upon opening of the port 33, it is desirable to locate the orifice 61 between the first port 29 and each of the second and third ports 31 and 33. The orifice 61 also serves to limit oil flow from conduit 47 for discharge through the port 33, thereby minimizing pressure changes upstream from the orifice 61, while facilitating a sharp drop in pressure in the conduit means 55.

In order to facilitate assembly of the orifice 61 in the passage 27, one end of the shaft 11 is counterbored at 85 to afford press fitting of the orifice 61 in the passageway 27. The counterbore 85 is closed by the plug 87.

In the arrangement shown in FIGURE 3, the conduit means 55 communicates with the pressure switch 25 which is normally open so long as a pressure condition above a predetermined level is maintained. However, upon a drop in pressure in the conduit means 55, the switch closes to electrically effect operation of a brake connected to the shaft 11. The brake can be of any conventional construction and can be either electrically or hydraulically operated.

If desired, conduit means 55 can be connected to both the device 21 and the switch 25 to effect simultaneous reduction in fuel supply and braking action. Alternatively, the switch 25 could be replaced with a spring biased mechanical switch or valve which is sensitive to the pressure in the conduit means 55 and which operates upon a drop in pressure, below a predetermined level, to hydraulically connect the brake 23 to a source of hydraulic pressure, as for instance the pump 43.

Various of the features of the invention are set forth in the following claims.

I claim:

1. The combination of a shaft, means mounting said shaft for rotation, means connected to said shaft for rotation thereof, a fluid passage in said shaft terminating at connected first, second, and third ports spaced axially of said shaft, means affording communication between said first port and a source of pressure fluid, an orifice located in said fluid passage between said first port and each of said second and third ports, conduit means affording communication between said second port and a device operable to effect reduction in the rate of shaft rotation in response to a drop in fluid pressure in said conduit means, a valve shiftable with respect to a first position closing said third port, and means operable in response to shaft rotation above a predetermined speed for shifting said valve to a position opening said third port whereby to afford a drop in the fluid pressure in said conduit means.

2. The combination of a shaft, means mounting said shaft for rotation, means connected to said shaft for rotation thereof, a fluid pressure sensing device operable to effect reduction in the rate of shaft rotation in response to a drop in the fluid pressure condition sensed thereby, a fluid passage in said shaft terminating at connected first, second, and third ports spaced axially of said shaft, means affording communication between said first port and a source of pressure fluid, an orifice located in said fluid passage between said first port and each of said second and third ports, conduit means affording communication between said second port and said device to afford sensing by said device of the fluid pressure condition in said conduit means, a valve shiftable with respect to a first position closing said third port, and means operable in response to shaft rotation above a predetermined speed for shifting said valve to a position opening said third port whereby to afford a drop in the fluid pressure in said conduit means.

3. The combination of a shaft, a pair of bearings mounting said shaft for rotation, each of said bearings including an annular groove therein, means connected to said shaft for rotation thereof, a fluid passage in said shaft having a first port in registry with said groove in one of said bearings, a second port in registry with said groove in the other of said bearings, and a third port spaced axially of said shaft from said first and second ports, means communicating between said annular groove of said one bearing and a source of pressure fluid, an orifice located in said fluid passage between said first port and each of said second and third ports, conduit means communicating between said groove in said other bearing and a device operable to effect reduction in the rate of shaft rotation in response to a drop in fluid pressure in said conduit means, a valve shiftable with respect to a first position closing said third port, means biasing said valve toward said first position, and means operable in response to shaft rotation above a predetermined speed for shifting said valve in opposition to said biasing means to a position opening said third port whereby to afford a drop in the fluid pressure in said conduit means.

4. The combination of a shaft, means mounting said shaft for rotation, means connected to said shaft for rotation thereof, a fluid passage in said shaft having axially spaced first, second, and third ports, means communicating between said first port and a source of pressure fluid, an orifice located in said fluid passage between said first port and each of said second and third ports, conduit means communicating between said second port and a device operable to effect reduction in the rate of shaft rotation in response to a drop in fluid pressure in said conduit means, a ring surrounding said shaft and shiftable axially of said shaft with respect to a first position closing said third port, a spring biasing said ring toward said first position, and a member pivotally connected to said shaft for rotation therewith and for radially outward movement in response to shaft rotation above a predetermined speed, said member including a finger engaging said ring and operable in response to said radially outward member movement to displace said ring in opposition to said spring to a position opening said third port, whereby to afford a drop in the fluid pressure in said conduit means.

5. The combination of a shaft, a pair of bearings mounting said shaft for rotation, each of said bearings including an annular groove therein, means connected to said shaft for rotation thereof, a fluid passage in said shaft having a first port in registry with said groove in one of said bearings, a second port in registry with said groove in the other of said bearings, and a third port spaced axially of said shaft from said first and second ports, means communicating between said annular groove of said one bearing and a source of pressure fluid, conduit means communicating between said groove in said other bearing and a device operable to effect reduction in the rate of shaft rotation in response to a drop in fluid pressure in said conduit means, a valve shiftable with respect to a first position closing said third port, means biasing said valve toward said first position, and means operable in response to shaft rotation above a predetermined speed for shifting said valve in opposition to said biasing means to a position opening said third port whereby to afford a drop in the fluid pressure in said conduit means.

References Cited

UNITED STATES PATENTS

| | | | |
|---|---|---|---|
| 801,322 | 10/1905 | Kerr | 137—33 |
| 2,168,372 | 8/1939 | Tabb | 137—53 |
| 2,270,306 | 1/1942 | Kalin | 137—53 |
| 2,378,158 | 6/1945 | Roche | 137—56 |
| 2,485,514 | 10/1949 | Sturrock | 137—56 |
| 2,588,140 | 3/1952 | McFarland | 137—56 X |
| 2,925,089 | 2/1960 | Conklin | 137—33 |
| 3,194,252 | 7/1965 | Locher | 137—34 X |
| 3,267,945 | 8/1966 | Bottoms | 137—19 |

FOREIGN PATENTS 875,579   8/1961   Great Britain.

CLARENCE R. GORDON, *Primary Examiner.*